US012798378B2

(12) United States Patent
Inoguchi et al.

(10) Patent No.: US 12,798,378 B2
(45) Date of Patent: Nov. 17, 2026

(54) CONTENT REPRODUCTION APPARATUS

(71) Applicant: Honda Motor Co., Ltd., Tokyo (JP)

(72) Inventors: Kaede Inoguchi, Tokyo (JP); Sunao Yamaguchi, Tokyo (JP); Kaho Tonomura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/060,712

(22) Filed: Feb. 23, 2025

(65) Prior Publication Data

US 2025/0296440 A1 Sep. 25, 2025

(30) Foreign Application Priority Data

Mar. 19, 2024 (JP) ................................ 2024-044030

(51) Int. Cl.
*B60K 35/28* (2024.01)

(52) U.S. Cl.
CPC .................................... *B60K 35/28* (2024.01)

(58) Field of Classification Search
CPC ...................................................... B60K 35/28
See application file for complete search history.

(56) References Cited

U.S. PATENT DOCUMENTS

2024/0370217 A1* 11/2024 Kasody ................. G06F 3/1454
2024/0427927 A1* 12/2024 Batie ................... G06F 21/6245

FOREIGN PATENT DOCUMENTS

JP 2021010395 A 2/2021
JP 2021144370 A 9/2021

* cited by examiner

*Primary Examiner* — Rodney A Butler
(74) *Attorney, Agent, or Firm* — Duft & Bornsen, PC

(57) ABSTRACT

A content reproduction apparatus configured to reproduce content in a vehicle. The apparatus includes a microprocessor configured to perform: communicating with terminals carried by a plurality of occupants riding in the vehicle, via wireless communication; acquiring content managed by the terminals, via the wireless communication; reproducing the content; acquiring personal information stored in each of the terminals, via the wireless communication; and generating relationship level information indicating strength of a relationship between the plurality of occupants based on the personal information. The microprocessor is configured to perform the acquiring of the content including enabling acquisition of the content with a higher degree of privacy as the relationship is stronger, based on the relationship level information.

8 Claims, 7 Drawing Sheets

CONTENT REPRODUCTION APPARATUS

CROSS-REFERENCE TO RELATED APPLICATION

This application is based upon and claims the benefit of priority from Japanese Patent Application No. 2024-044030 filed on Mar. 19, 2024, the content of which is incorporated herein by reference.

BACKGROUND

Technical Field

The present invention relates to a driving control apparatus configured to reproduce a content.

Related Art

As this type of technology, a technology for activating a conversation between occupants riding on a vehicle has been developed. For example, JP 2021-10395 A discloses an information processing apparatus that enhances the degree of concentration on a conversation by cutaneous sensory stimulation and thermal stimulation to the neck, gives sensory stimulation to an occupant with a small voice volume according to each occupant based on a research result that conversation can be promoted or activated, and promotes and activates the conversation.

In addition, JP 2021-144370 A discloses a vehicle share-ride support system that creates a share-ride group based on a user's knowledge and a subject that the user wants to talk about at the time of executing share-ride.

However, since the technology described in JP 2021-10395 A does not provide a subject of the conversation itself, the conversation eventually runs out. In addition, since the occupant who is the user is forced to have a conversation, there is a risk that it may be a psychological or physical burden on the user.

In addition, in the technology described in JP 2021-144370 A, since a share-ride service called ride-share is targeted, the occupants are strangers having the same destination. Therefore, other than the ride-share, for example, use involving riding together with a family, which is a usage form of a normal passenger car, is not assumed.

Therefore, there has been a demand from the user for a mechanism of promoting conversation with less psychological and physical burden for enjoying a drive to a destination when using the vehicle with a family member, acquaintance, or the like.

SUMMARY

An aspect of the present invention is a content reproduction apparatus configured to reproduce content in a vehicle. The apparatus includes a microprocessor configured to perform: communicating with terminals carried by a plurality of occupants riding in the vehicle, via wireless communication; acquiring content managed by the terminals, via the wireless communication; reproducing the content; acquiring personal information stored in each of the terminals, via the wireless communication; and generating relationship level information indicating strength of a relationship between the plurality of occupants based on the personal information. The microprocessor is configured to perform the acquiring of the content including enabling acquisition of the content with a higher degree of privacy as the relationship is stronger, based on the relationship level information.

BRIEF DESCRIPTION OF DRAWINGS

The objects, features, and advantages of the present invention will become clearer from the following description of embodiments in relation to the attached drawings, in which.

DETAILED DESCRIPTION OF THE INVENTION

An embodiment of the invention will be described below with reference to the drawings.

<Outline of Content Reproduction Apparatus>

A content reproduction apparatus according to an embodiment reproduces, for example, content for a person in a vehicle cabin of a moving vehicle such as an automobile. The content to be reproduced (hereinafter, referred to as reproducing content) is content that can be reproduced as voice and/or video by a reproduction device (which may be referred to as an output device) provided in the vehicle.

It is assumed that a plurality of people (e.g., four people) including the driver are riding in the vehicle cabin. The content reproduction apparatus reproduces the content in the vehicle cabin with an expectation of promoting a conversation for a family member, an acquaintance, or the like riding together to enjoy the drive to a destination.

The content is managed by a wireless communication terminal (hereinafter, simply referred to as a terminal) such as a smartphone carried by any of the occupants. For the reproduced content, the occupant carrying the terminal that manages the content introduces or explains the content of the content being reproduced to another occupant, so that it is possible to activate the conversation between the occupants in the vehicle cabin.

In the above-described scene and the like, the content reproduction apparatus provides a service for promoting a conversation with less psychological and physical burden on the occupants.

In the embodiment, a content reproduction apparatus is provided as one of the functions of an in-vehicle infotainment (IVI) system provided in a vehicle. Such a content reproduction apparatus will be described in more detail.

<System Configuration Example>

Figure 1:
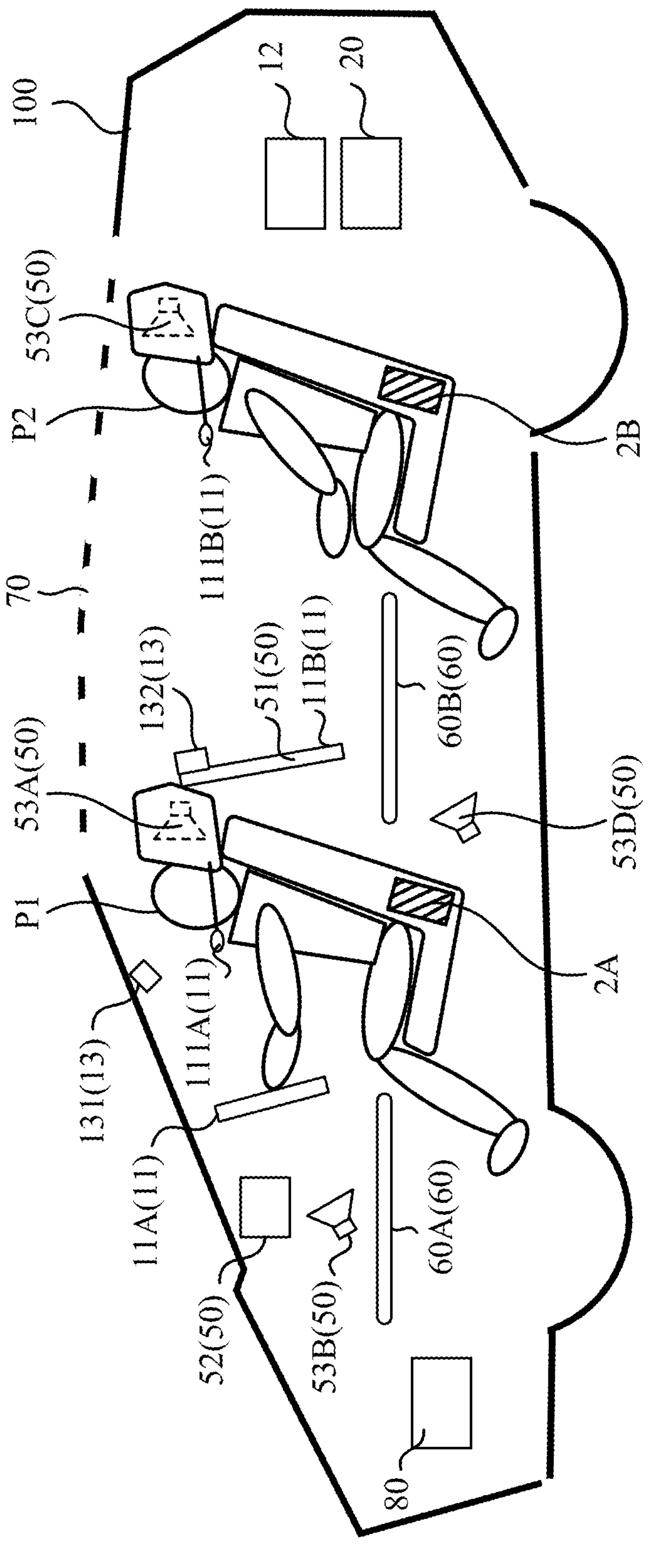
FIG. 1 is a schematic diagram illustrating an example of an IVI system including a content reproduction apparatus.

FIG. 1 is a schematic diagram illustrating an example of an IVI system including a content reproduction apparatus. The IVI system includes a control apparatus 20, a vehicle sensor group 12 of a vehicle 100 serving as a moving body, a display unit 51, a projection unit 52, and voice reproducing units 53A to 53D constituting an output device 50 provided in the vehicle 100, operation detection units 11A and 11B and microphones 111A and 111B constituting an input device 11 provided in the vehicle 100, a front seat camera 131 and a rear seat camera 132 constituting a vehicle cabin camera 13 provided in the vehicle 100, a terminal 2A used by an occupant P1 in a front seat of the vehicle cabin, and a terminal 2B used by an occupant P2 in a rear seat of the vehicle cabin.

The control apparatus 20 and the terminals 2A and 2B are configured to be able to perform wireless communication. The control apparatus 20, the output device 50, the input device 11, the vehicle sensor group 12, and the vehicle cabin camera 13 are configured to be able to perform wired communication by a controller area network (CAN) or the like.

Note that the vehicle 100 includes an air conditioner 80 that adjusts temperature and humidity in the vehicle cabin, a lighting device 70 (which may also be referred to as a dimming sunroof) that can adjust a lighting amount into the vehicle cabin by a dimming glass covering substantially the entire ceiling of the vehicle cabin, and an ambient light 60A for a front seat and an ambient light 60B for a rear seat constituting an illumination device 60.

As an example, the terminals 2A and 2B are configured by a smartphone or the like used by each of the occupants P1 and P2. The terminals 2A and 2B may be held by a holder (not illustrated) installed on a seat on which each person sits.

Although the two terminals 2A and 2B are illustrated as the terminals used by the occupants P1 and P2, the actual number of terminals varies depending on the number of occupants, and is four in a case where there are four occupants. In addition, the number of cameras constituting the vehicle cabin camera 13, the number of operation detection units and microphones constituting the input device 11, and the number of display units, projection units, and voice reproducing units constituting the output device 50 may also be appropriately changed according to the number of occupants.

Figure 2:
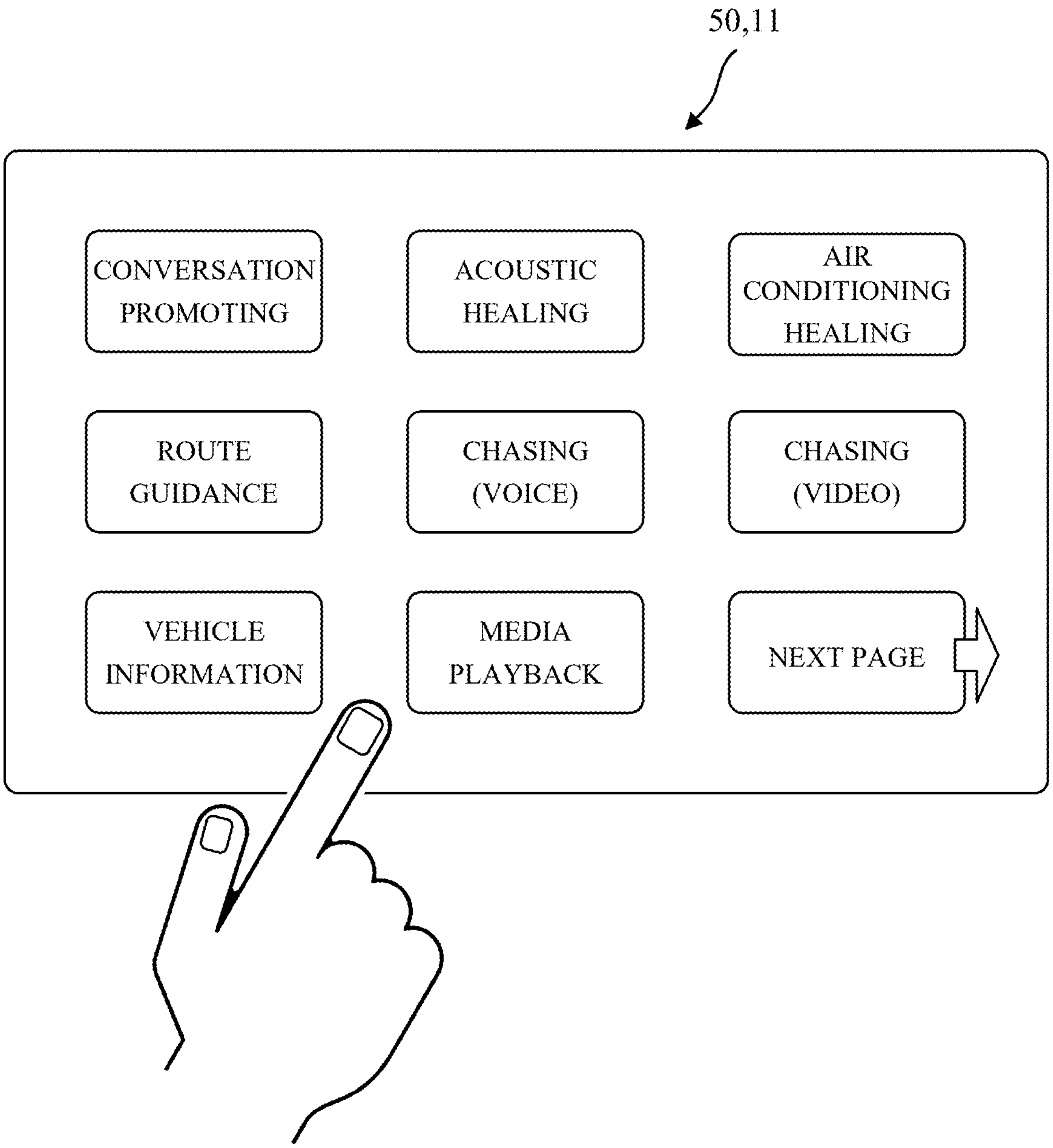
FIG. 2 is a diagram illustrating an operation menu screen.

FIG. 2 is a diagram illustrating an operation menu screen of the IVI system of FIG. 1. In the embodiment, the image is projected or displayed on the output device 50 (projection unit 52, display unit 51). When a menu button (which may be referred to as an icon) displayed on the output device 50 is touch operated or a voice corresponding to the menu button is input from the microphones 111A and 111B constituting the input device 11, the control apparatus 20 starts an operation of a function corresponding to the touch operated or the audio input menu.

The operation menu screen illustrated in FIG. 2 includes menu buttons corresponding to a "conversation promoting" function of supporting conversation between occupants of the vehicle 100;

an "acoustic healing" function of soothing the occupants by reproduced sounds by the voice reproducing units 53A to 53D; an "air conditioning healing" function of soothing the occupants by using the air conditioner 80; a "route guidance" function of guiding a travel route to a destination; a "chasing (voice)" function of connecting a terminal of an occupant who got off the vehicle 100 and a communication unit (to be described later) of the control apparatus 20 to transmit an external voice to an occupant in the vehicle cabin; a "chasing (video)" function of connecting the terminal of the occupant who got off the vehicle 100 and the communication unit (to be described later) of the control apparatus 20 to transmit an external video to the occupant in the vehicle cabin; a "vehicle information" function of performing function setting of the vehicle 100 and an auxiliary machine operation, and the like, a "media playback" function of reproducing a medium on which content is recorded, from the output device 50, and other functions (description is omitted).

Hereinafter, the function of the control apparatus 20 as the content reproduction apparatus in a case where the "conversation promoting" button on the operation menu screen is operated will be mainly described. FIGS. 3A to 3D are diagrams describing a configuration example of each unit in FIG. 1.

<Content Reproduction Apparatus>

Figure 3A:
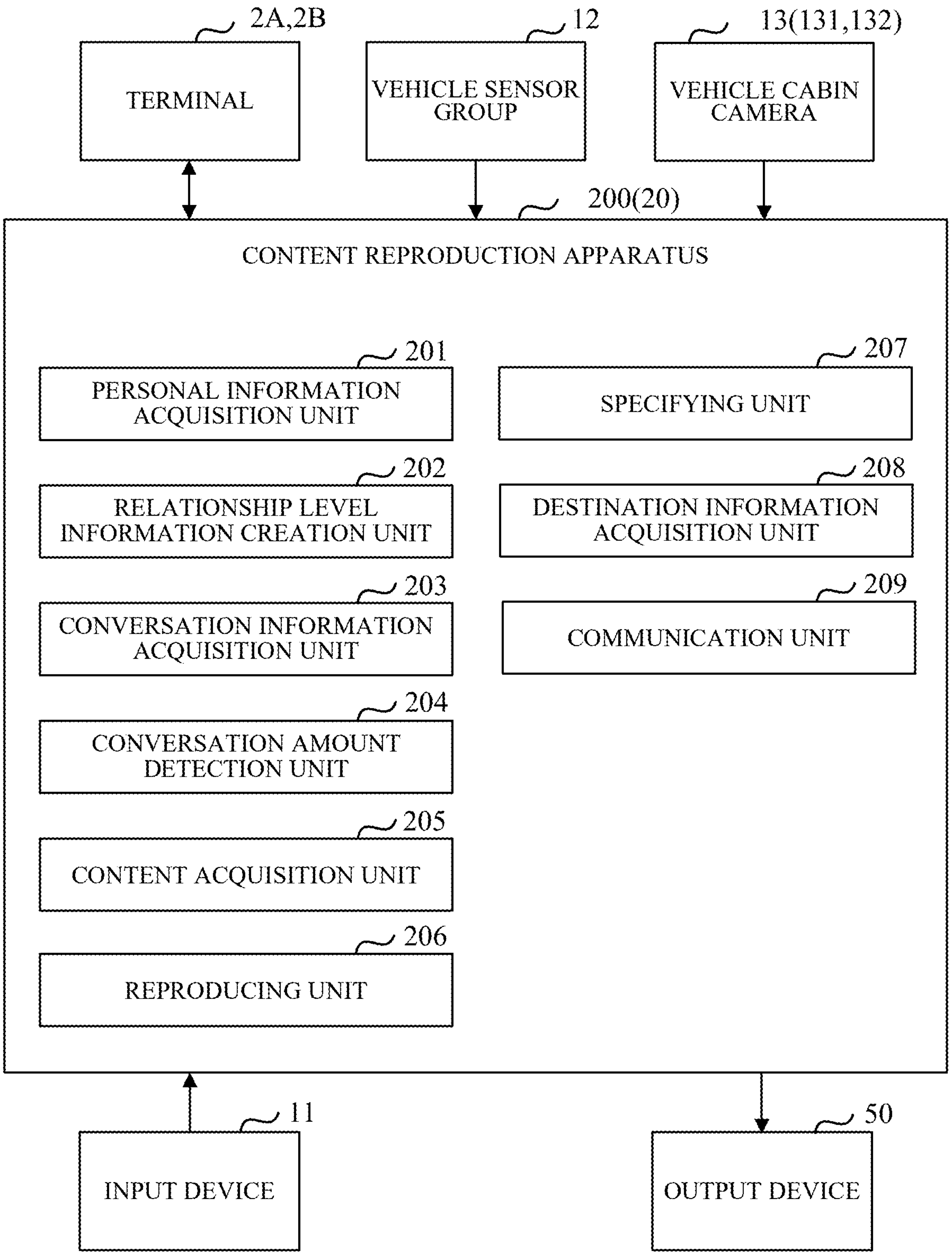
FIG. 3A is a block diagram illustrating a configuration of a main part of the content reproduction apparatus.

FIG. 3A is a block diagram illustrating a configuration of a main part of the control apparatus 20. The control apparatus 20 includes an arithmetic processing unit such as a micro processing unit (MPU) (not illustrated), and reads and executes a predetermined program stored in a storage unit (not illustrated) to perform various information processing, control processing, and the like necessary for the control apparatus 20.

The control apparatus 20 includes, as a functional configuration for the content reproduction apparatus 200, a personal information acquisition unit 201, a relationship level information creation unit 202, a conversation information acquisition unit 203, a conversation amount detection unit 204, a content acquisition unit 205, a reproducing unit 206, a specifying unit 207, a destination information acquisition unit 208, and a communication unit 209, and performs control so that the IVI system functions as the content reproduction apparatus 200.

(Personal Information Acquisition Unit)

The personal information acquisition unit 201 acquires personal information of each person from the terminals 2A and 2B carried by the plurality of occupants P1 and P2 in the vehicle cabin of the vehicle 100 via the communication unit 209. The personal information includes, for example, home position information indicating the home position of each person, information of a telephone directory registered by each person, and device information of the terminals 2A and 2B carried by each person. The device information may include, for example, a device name (which may be a device ID), a model name, terminal position information, and information necessary for wireless communication connection.

In addition, the personal information may include information regarding a social networking service (SNS), a short message service (SMS), and a mail (e-mail) used on the terminals 2A and 2B carried by each person (including a specific account name etc. (follow information) that the user follows on the SNS), a keyword used at the time of past search on the terminals 2A and 2B, a history of a destination set in the past, information regarding content subscribed or viewed by subscription or the like, information on the Internet acquired in the past, setting information for an auxiliary machine or the like of the vehicle 100, and the like.

Furthermore, information held by the terminals 2A and 2B (e.g., at least one of a name, an age, an address, a telephone number of the terminal user, a name of a family member, a name of a company or an association where the terminal user works, a name of a school or the like where the terminal user is enrolled, a list of contents managed by the terminals 2A and 2B, etc.) may be included, and information estimated from the information regarding the SNS or the like (e.g., a family structure of the user) may be included.

In the embodiment, as an example, when the occupants P1 and P2 get on the vehicle 100, the control apparatus 20 talks to the occupants P1 and P2 via the voice reproducing units 53A to 53D constituting the output device 50, and collects sounds of the voice response from the occupants P1 and P2

(e.g., stating their own name) with the microphones 111A and 111B constituting the input device 11 and also images the occupants P1 and P2 with the front seat camera 131 and the rear seat camera 132 constituting the vehicle cabin camera 13.

The control apparatus 20 associates (or alternatively, correlates) the faces of the occupants P1 and P2, the names of the occupants P1 and P2, and the frequency components of the voice uttered by the occupants P1 and P2. In addition, the control apparatus 20 acquires the personal information from the terminals 2A and 2B carried by the occupants P1 and P2 by the personal information acquisition unit 201 based on the consent of the occupants P1 and P2.

(Relationship Level Information Creation Unit)

The relationship level information creation unit 202 creates the relationship level information indicating the strength of the relationship between the plurality of occupants P1 and P2 (which may also be referred to as the degree of intimacy) based on the personal information.

The relationship level information is information indicating the intimacy between the occupants P1 and P2 in the vehicle cabin. The relationship level information creation unit 202 estimates the relationship level in three stages (high, normal, low), for example, based on a call history between the terminals 2A and 2B in a latest predetermined period (e.g., the last 30 days) and a past predetermined period (e.g., five years), a usage history of a message application used between the terminals 2A and 2B, or the like.

As an example, in a case where the phone numbers are registered between the terminals 2A and 2B, the relationship level information creation unit 202 estimates that the relationship between the occupants P1 and P2 carrying the terminals 2A and 2B is strong, and in a case where the attribute assigned to the phone number indicates a relative, the relationship is stronger.

Furthermore, as another example, in a case where the respective follow information is registered between the terminals 2A and 2B, the relationship level information creation unit 202 estimates that the relationship between the occupants P1 and P2 carrying the terminals 2A and 2B is strong.

As still another example, in a case where the home position information acquired from the terminals 2A and 2B match each other, it is estimated that the relationship between the occupants P1 and P2 carrying the terminals 2A and 2B is strong.

The relationship level information created by the relationship level information creation unit 202 is used for determining a search range of content to be reproduced in front of the plurality of occupants P1 and P2. Specifically, in a case where the plurality of occupants P1 and P2 are family members and the relationship level is high, the search range is set to be wide so that content with a high degree of privacy that is not normally disclosed to others is included in the search target, and reproduction of private content in front of the occupants P1 and P2 who are family members is allowed.

On the other hand, when another person is included in the plurality of occupants P1 and P2 and the relationship level is low, the search range is narrowed so as to exclude content having a high degree of privacy that is not normally disclosed to another person from the search target, and reproduction of private content is in front of the occupants P1 and P2 including another person is avoided.

Note that, in a case where the content includes a video, the video content including a person other than the plurality of occupants P1 and P2 (i.e., the person carrying the terminals 2A and 2B) may be avoided from being reproduced in front of the occupants P1 and P2.

(Conversation Information Acquisition Unit)

The conversation information acquisition unit 203 acquires a conversation by a plurality of occupants P1 and P2 in the vehicle cabin as conversation information in a state where the occupants P1 and P2 can be specified. When voice signals are input from microphones 111A and 111B constituting the input device 11, the conversation information acquisition unit 203 recognizes the content of utterance by the occupants P1 and P2 based on the input voice signals, for example, using a technology such as voice recognition or natural language processing. As a result, it is determined that the conversation information has been acquired at least in a case where the conversation information can be recognized as a language.

Furthermore, the conversation information acquisition unit 203 specifies the speaker based on the frequency components of the voice signals input from the microphones 111A and 111B. The specification of the speaker is performed by comparing the frequency components of the voice signals of the occupants P1 and P2 associated with each other when the occupants P1 and P2 get on the vehicle 100 with the frequency components of the voice signals acquired as the conversation information.

(Conversation Amount Detection Unit)

The conversation amount detection unit 204 repeatedly detects a conversation amount within a predetermined period (e.g., the last five minutes) at predetermined time intervals (e.g., 30 seconds) based on the conversation information acquired by the conversation information acquisition unit 203. As an example, the conversation amount is represented by a ratio of a voice input time excluding a blank time (so-called silent time during which no voice signal is input from the microphones 111A and 111B) in the five minutes to the five minutes.

The control apparatus 20 determines that the conversation by the occupants P1 and P2 is continued when the conversation amount exceeds a predetermined value (e.g., 90%), and determines that the conversation by the occupants P1 and P2 is interrupted and content reproduction for promoting the conversation is necessary when the conversation amount decreases to less than or equal to the predetermined value.

(Content Acquisition Unit)

In a case where it is determined that content reproduction for promoting a conversation is necessary, the content acquisition unit 205 acquires content from the terminals 2A and 2B carried by the plurality of occupants P1 and P2 in the vehicle cabin via the communication unit 209. The content acquisition unit 205 may acquire the content not only from the terminals 2A and 2B but also from an external content management server via a communication network (not illustrated). The content management server includes a cloud storage configured to store content and a streaming server configured to reproduce content. The content acquisition unit 205 searches for and acquires content to be reproduced to promote a conversation. At this time, the content acquisition unit 205 determines a content search range based on the relationship level information created by the relationship level information creation unit 202, and searches for content according to the search range.

Note that the acquired content may be video content (moving image, still image, text display, icon display, graphic display, etc.) or sound content. The sound content includes voice content and music content.

(Reproducing Unit)

In a case where the content to be reproduced to promote a conversation is video content, the reproducing unit 206 outputs a video signal to the output device 50.

Furthermore, in a case where the content to be reproduced to promote a conversation is sound content, the reproducing unit 206 outputs a reproduction signal to the output device 50.

(Specifying Unit)

The specifying unit 207 specifies the driver of the vehicle 100 among the plurality of occupants P1 and P2. For example, the specifying unit 207 specifies the occupant P1 seated in the driver's seat as the driver based on an image imaged by the front seat camera 131 constituting the vehicle cabin camera 13 when the occupants P1 and P2 get on the vehicle 100.

(Destination Information Acquisition Unit)

The destination information acquisition unit 208 acquires destination information indicating a destination set for causing the IVI system to perform "route guidance" and tag information associated with the destination in advance. For example, when the destination is a shopping mall, the tag information may be a name of a store constituting the shopping mall, a product name of the store, a name of an area where the shopping mall is situated, a local product, or the like.

(Communication Unit)

The communication unit 209 includes a short-range wireless communication module (not illustrated) that performs wireless communication with the terminals 2A and 2B and a wired communication module (not illustrated) that performs wired communication by CAN or the like. A wireless communication system having a direction detection function may be adopted as the short-range wireless communication module.

<Terminal>

Figure 3B:
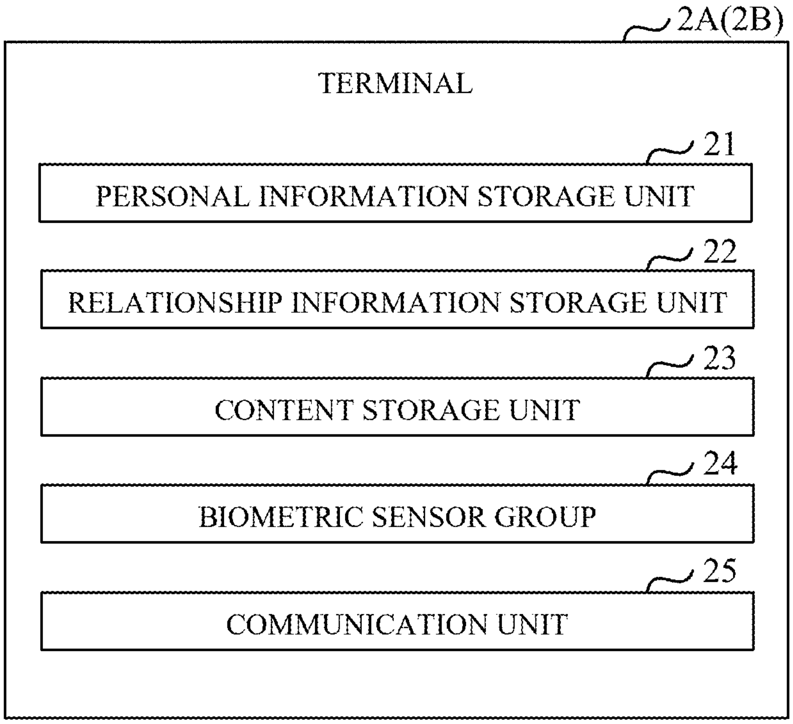
FIG. 3B is a block diagram illustrating a configuration of a main part of a terminal.

FIG. 3B is a block diagram illustrating a configuration of a main part of the terminal 2A. Since the configuration of the terminal 2B is similar to that of the terminal 2A, illustration thereof will be omitted. The terminal 2A includes an arithmetic processing unit such as an MPU (not illustrated), and reads and executes a predetermined program (which may also be referred to as an application) stored in a storage unit (not illustrated) to perform various information processing, control processing, and the like necessary for a functional configuration described below.

The terminal 2A includes a storage unit such as a ROM and a RAM, specifically, a personal information storage unit 21, a relationship information storage unit 22, and a content storage unit 23. In addition, the terminal 2A includes a biometric sensor group 24 and a communication unit 25 as functional configurations. In general, a smartphone includes a display unit, an input unit, a voice reproducing unit, a camera, a position detection unit, and the like, but illustration and description thereof are omitted.

Note that the terminal 2A may share a function with another device such as a smart watch (not illustrated).

(Personal Information Storage Unit)

The personal information storage unit 21 stores the above-described personal information of the occupant P1 carrying the terminal 2A.

(Relationship Information Storage Unit)

The relationship information storage unit 22 stores relationship level information of the occupant P1 using the terminal 2A. When information from the control apparatus 20 is received via the communication unit 25, the information is stored. Specifically, in a case where the relationship level information indicating the intimacy between the occupants P1 and P2 in the vehicle cabin created by the relationship level information creation unit 202 is received via the communication unit 25, the information is stored.

(Content Storage Unit)

The content storage unit 23 stores content collected by the occupant P1 carrying the terminal 2A or information (e.g., a cloud storage that stores content, a URL of a server that streams and reproduces content, etc.) necessary for reproduction of the content.

(Biometric Sensor Group)

The biometric sensor group 24 includes, for example, a heart rate sensor that acquires a heart rate of the occupant P1 carrying the terminal 2A, a respiration sensor that acquires a respiration rate, a blood flow rate sensor that acquires a blood flow rate, and a skin electrical resistance sensor that acquires a skin electrical resistance value (all not illustrated).

(Communication Unit)

The communication unit 25 includes a short-range wireless communication module (not illustrated) that performs wireless communication with the control apparatus 20 and a wired communication module (not illustrated) that performs wired communication by CAN or the like.

Figure 3C:
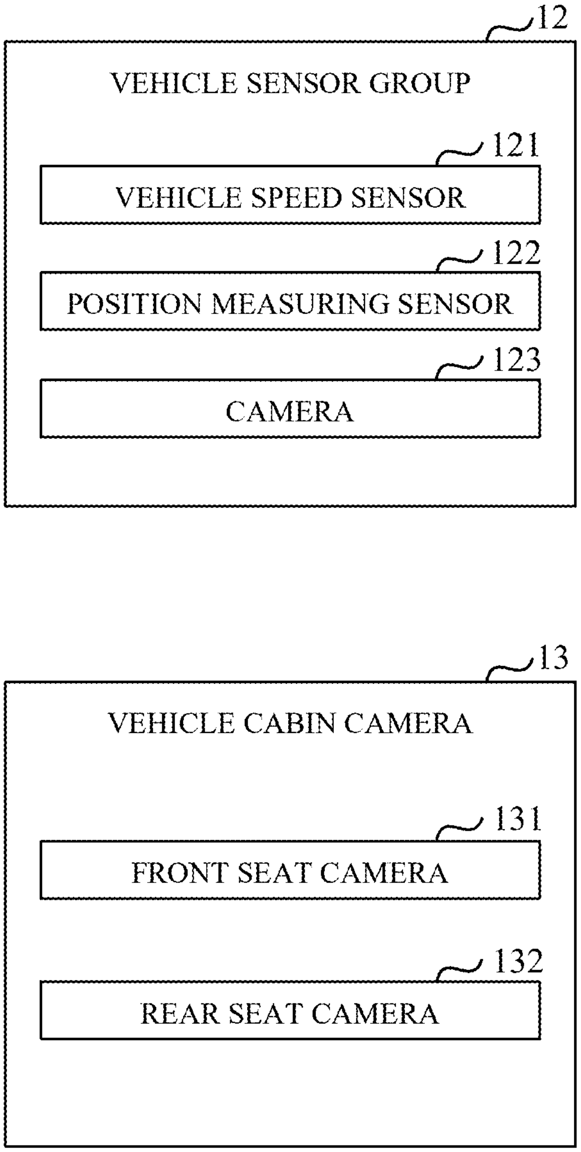
FIG. 3C is a block diagram illustrating a configuration of a main part of a vehicle sensor group and a vehicle cabin camera.

FIG. 3C is a block diagram illustrating a configuration of a main part of the vehicle sensor group 12 and the vehicle cabin camera 13 of the vehicle 100.

<Vehicle Sensor Group>

The vehicle sensor group 12 includes a vehicle speed sensor 121, a position measuring sensor 122, and a camera 123. In general, an acceleration sensor, a radar, and the like are mounted on the vehicle 100 as sensors, but illustration and description thereof are omitted.

(Vehicle Speed Sensor)

The vehicle speed sensor 121 detects a vehicle speed of the vehicle 100 and outputs vehicle speed information to the control apparatus 20.

(Position Measuring Sensor)

The position measuring sensor 122 detects the current position of the vehicle 100 based on position measuring signals from global positioning system (GPS) satellites, quasi-zenith satellites, or the like. The position measuring sensor 122 outputs a signal indicating the current position to the control apparatus 20 as position information.

(Camera)

The camera 123 images the surroundings of the vehicle 100. The camera 123 outputs the data of a subject image to the control apparatus 20 as image information. The camera 123 can capture a still image or a moving image.

<Vehicle Cabin Camera>

The vehicle cabin camera 13 includes the front seat camera 131 and the rear seat camera 132. The front seat camera 131 images the upper body of the occupant P1 sitting in the front seat, and outputs data of the subject image to the control apparatus 20 as image information. The rear seat camera 132 images the upper body of the occupant P2 sitting in the rear seat, and outputs data of the subject image to the control apparatus 20 as image information.

Figure 3D:
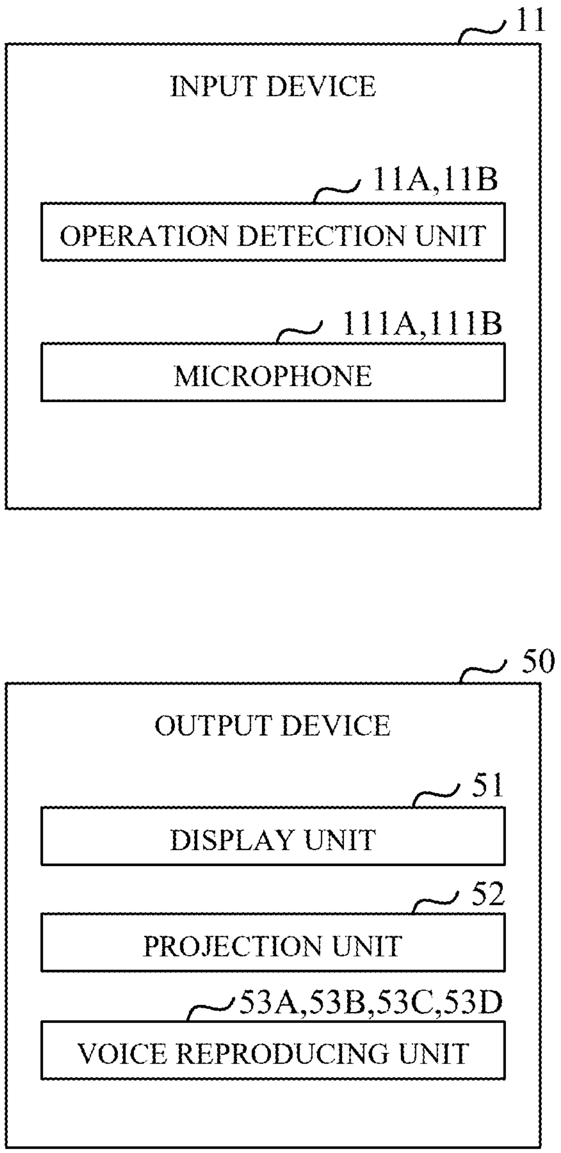
FIG. 3D is a block diagram illustrating a configuration of a main part of an input device and an output device.

FIG. 3D is a block diagram illustrating a configuration of a main part of the input device 11 and the output device 50 of the control apparatus 20 of the vehicle 100.

<Input Device>

The input device 11 includes operation detection units 11A and 11B and microphones 111A and 111B.

(Operation Detection Unit)

The operation detection unit 11A detects an operation by the occupant P1 in the front seat and outputs an operation signal based on the detected operation to the control apparatus 20. The operation detection unit 11A may be configured as a pointing device that interlocks with a projection image projected by the projection unit 52 described later. The operation detection unit 11B is provided on the display surface of the display unit 51. The operation detection unit 11B is operated by the occupant P2 in the rear seat and outputs an operation signal indicating a touch position to the control apparatus 20.

(Microphone)

The microphone 111A collects a voice uttered by the occupant P1 in the front seat, and outputs a voice signal based on the collected voice to the control apparatus 20. The microphone 111B collects a voice uttered by the occupant P2 in the rear seat, and outputs a voice signal based on the collected voice to the control apparatus 20.

<Output Device>

The output device 50 includes the display unit 51, the projection unit 52, and the voice reproducing unit 53. The output device 50 is used, for example, for displaying the operation menu screen in FIG. 2, reproducing content, or the like. (Display unit)

The display unit 51 has a screen such as a liquid crystal display, and displays image information based on a display signal output from the control apparatus 20. The image information includes the operation menu screen of FIG. 2, an image of video content, and the like.

(Projection Unit)

The projection unit 52 includes, for example, a head-up display (HUD) to be projected on a windshield or the like, and projects image information based on a projection signal output from the control apparatus 20. The image information includes the operation menu screen of FIG. 2, an image of video content, and the like.

(Voice Reproducing Unit)

The voice reproducing units 53A to 53D are configured as speakers configured to reproduce and output voice and the like, and reproduce sound content based on a reproduction signal output from the control apparatus 20. Note that a voice output unit that outputs a content reproduction signal to a headphone (not illustrated) or the like may be provided.

<Description of Flowchart>

Figure 4:
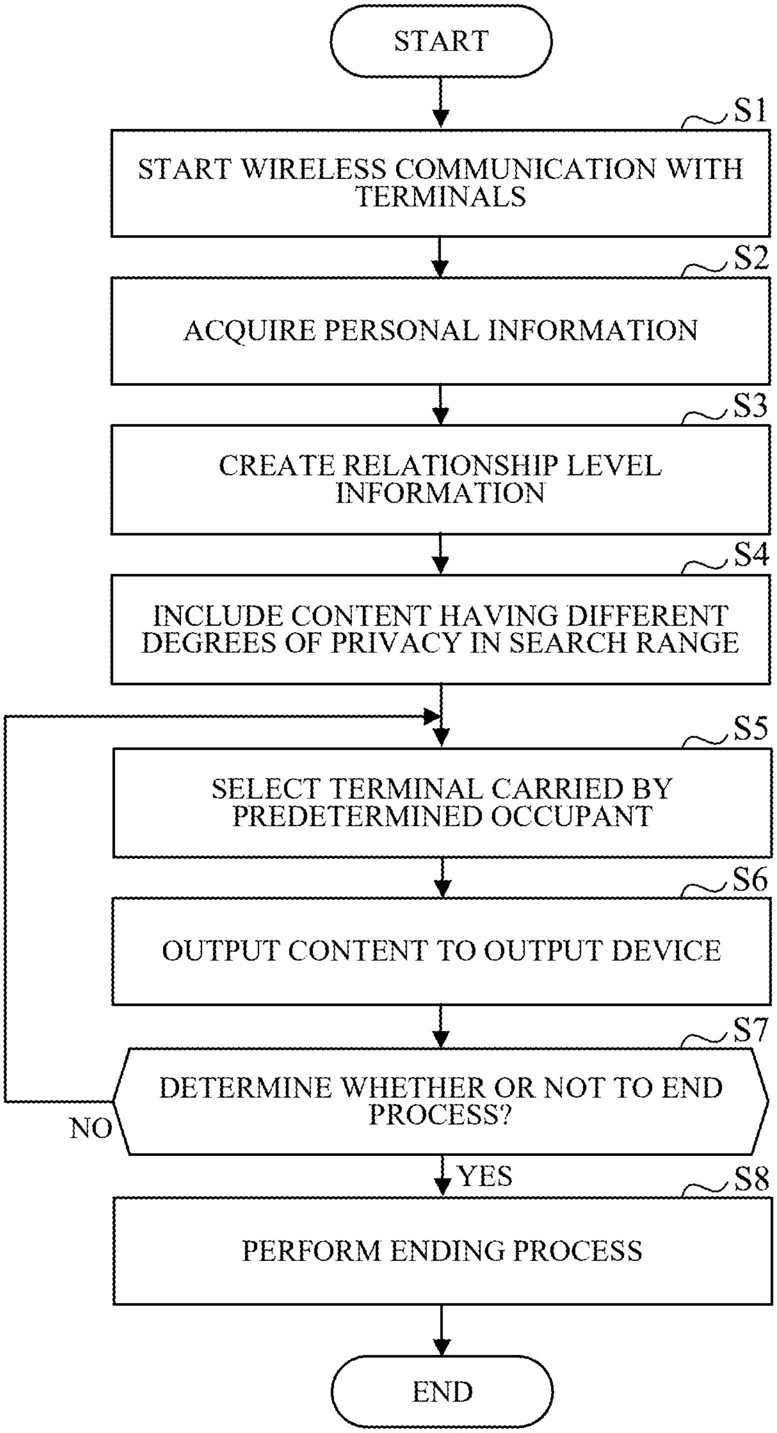
FIG. 4 is a flowchart illustrating a content reproducing process by a program.

FIG. 4 is a flowchart illustrating an example of content reproducing process by a program executed by the MPU of the control apparatus 20. When the "conversation promoting" button is operated on the operation menu screen in FIG. 2, the MPU of the control apparatus 20 executes a program for causing the IVI system to function as a content reproduction apparatus. The control apparatus 20 functions as a control unit of the content reproduction apparatus 200 while executing the program for performing the process illustrated in FIG. 4.

In step S1 of FIG. 4, the control apparatus 20 causes the communication unit 209 to start wireless communication with the terminals 2A and 2B carried by the occupants P1 and P2 in the vehicle cabin, and proceeds to step S2. When the communication unit 209 and the terminals 2A and 2B have already started wireless communication, the process directly proceeds to step S2.

In step S2, the control apparatus 20 causes the personal information acquisition unit 201 to acquire the personal information from the terminals 2A and 2B carried by the plurality of occupants P1 and P2 in the vehicle cabin, and proceeds to step S3.

In step S3, the control apparatus 20 causes the relationship level information creation unit 202 to create the relationship level information indicating the strength of the relationship between the plurality of occupants P1 and P2 based on the personal information acquired by the personal information acquisition unit 201, and proceeds to step S4. The method of estimating the strength of the relationship between the plurality of occupants P1 and P2 is as described above.

In step S4, the control apparatus 20 sends an instruction to the content acquisition unit 205 to include, in the search range, content having different degrees of privacy depending on the strength of the relationship between the plurality of occupants P1 and P2. After transmitting the instruction to the content acquisition unit 205, the control apparatus 20 proceeds to step S5.

In step S5, the control apparatus 20 causes the content acquisition unit 205 to acquire the content managed by the terminals 2A and 2B carried by the plurality of occupants P1 and P2 via the communication unit 209, and proceeds to step S6. The content acquired from the terminal 2A or 2B may be, for example, content having the highest reproduction frequency, content acquired most recently, or content selected in advance in the terminals 2A and 2B. In the embodiment, what kind of content can be provided from the terminals 2A and 2B can be set by the occupants P1 and P2 in advance.

In step S6, the control apparatus 20 causes the reproducing unit 206 to output the content to the output device 50, and proceeds to step S7. In a case where the content to be reproduced to promote a conversation is video content, the reproducing unit 206 outputs a video signal to the output device 50. Furthermore, in a case where the content to be reproduced to promote a conversation is sound content, the reproducing unit 206 outputs a reproduction signal to the output device 50.

In the embodiment, the occupant P1 or P2 carrying the terminal 2A or 2B that manages the content being reproduced introduces or explains the content of the content being reproduced to the other occupant P2 or P1, so that it is possible to activate the conversation between the occupants in the vehicle cabin.

The control apparatus 20 may, for example, cause the ambient light 60A or 60B to emit light to urge the occupant P1 or P2 carrying the terminal 2A or 2B that manages the content being reproduced to introduce or explain the content of the content being reproduced.

In a case where the occupant P1 or P2 is urged to introduce or explain the content of the content using the light of the ambient lights 60A and 60B, a color may be determined in advance for each of the terminals 2A and 2B (i.e., the occupants P1 and P2 carrying the terminal), and the control apparatus 20 may change the color of the light of the ambient lights 60A and 60B to urge the occupant P1 or P2 corresponding to the color to introduce or explain the content of the content being reproduced.

In step S7, the control apparatus 20 determines whether or not to end the content reproducing process. The control apparatus 20 makes an affirmative determination in step S7 and proceeds to step S8 in a case where a predetermined ending operation is performed, and makes a negative determination in step S7 and returns to step S5 in a case where the ending operation is not performed. In the case of returning to step S5, the control apparatus 20 repeats the above-described process. That is, the content is automatically reproduced to promote the conversation.

In step S8, the control apparatus 20 performs the ending process and ends the process according to FIG. 4. The ending process includes, for example, ending of content output by the reproducing unit 206, deletion of the personal information acquired by the personal information acquisition unit 201, and ending of wireless communication with the terminals 2A and 2B by the communication unit 209. Note that the wireless communication with the terminals 2A and 2B by the communication unit 209 may not be ended in a case where the wireless communication is required in a process other than the content reproducing process.

According to the embodiment described above, the following effects are obtained.

(1) A content reproduction apparatus 200 configured to reproduce content in a vehicle 100 includes: a communication unit 209 configured to wirelessly communicate with terminals 2A and 2B carried by a plurality of occupants P1 and P2 riding in the vehicle 100; a content acquisition unit 205 configured to acquire, via the communication unit 209, content managed by the terminals 2A and 2B carried by the plurality of occupants P1 and P2; a reproducing unit 206 configured to reproduce the content acquired by the content acquisition unit 205; a personal information acquisition unit 201 configured to acquire, via the communication unit 209, personal information saved in the terminals 2A and 2B of the occupants P1 and P2; and a relationship level information creation unit 202 configured to create, based on the personal information, relationship level information indicating strength of a relationship between the plurality of occupants P1 and P2, wherein the content acquisition unit 205 can acquire content having a higher degree of privacy the stronger the relationship based on the relationship level information. With this configuration, the conversation between the occupants P1 and P2 can be naturally promoted with the reproduced content as a topic without imposing a psychological or physical burden on the plurality of occupants P1 and P2. For example, when an occupant (e.g., P2) carrying a terminal (e.g., 2B) that manages content introduces and explains a picture, music, or the like included in the content, this becomes a trigger for conversation, and another occupant (e.g., P1) can be expected to participate in the conversation and engage in a lively conversation. Furthermore, since content having a higher degree of privacy is reproduced the stronger the relationship between the occupants P1 and P2, a conversation unique to intimate occupants or close occupants can be expected.

(2) In the content reproduction apparatus 200, the personal information acquisition unit 201 acquires information of a telephone directory registered by each of the occupants P1 and P2 from the terminals 2A and 2B of the plurality of occupants P1 and P2 as the personal information, and the relationship level information creation unit 202 estimates that the relationship between the plurality of occupants P1 and P2 is strong in a case where the respective phone numbers are registered between the terminals 2A and 2B in the vehicle 100, and the relationship is stronger in a case where an attribute given to the phone number indicates a relative.

With this configuration, the relationship between the plurality of occupants P1 and P2 can be accurately grasped. As a result, it is possible to naturally promote the conversation between the occupants P1 and P2 with the reproduced content as a topic without imposing a psychological or physical burden on the occupants P1 and P2. Furthermore, a conversation unique to intimate occupants or close occupants can be expected.

(3) In the content reproduction apparatus 200, the personal information acquisition unit 201 acquires follow information of a social network service registered by each of the occupants P1 and P2 from the terminals 2A and 2B of the plurality of occupants P1 and P2 as the personal information, and the relationship level information creation unit 202 estimates that the relationship between the plurality of occupants P1 and P2 is strong when the follow information is registered between the terminals 2A and 2B in the vehicle 100.

With this configuration, the relationship between the plurality of occupants P1 and P2 can be accurately grasped. As a result, it is possible to naturally promote the conversation between the occupants P1 and P2 with the reproduced content as a topic without imposing a psychological or physical burden on the occupants P1 and P2. Furthermore, a conversation unique to intimate occupants or close occupants can be expected.

(4) In the content reproduction apparatus 200, the personal information acquisition unit 201 acquires home position information of each of the occupants P1 and P2 from the terminals 2A and 2B of the plurality of occupants P1 and P2 as the personal information, and the relationship level information creation unit 202 estimates that the relationship between the plurality of occupants P1 and P2 is strong when the home position information matches between the terminals 2A and 2B in the vehicle 100.

With this configuration, the relationship between the plurality of occupants P1 and P2 can be accurately grasped. As a result, it is possible to naturally promote the conversation between the occupants P1 and P2 with the reproduced content as a topic without imposing a psychological or physical burden on the occupants P1 and P2. Furthermore, a conversation unique to intimate occupants or close occupants can be expected.

The above embodiments can be modified in various manners. Hereinafter, modified examples will be described.

First Modified Example

In the above-described embodiment, an example has been described in which the relationship level information creation unit 202 estimates that the relationship between the occupants P1 and P2 carrying the terminals 2A and 2B is strong in a case where the respective follow information is registered between the terminals 2A and 2B. Here, the follow information may include a message exchange frequency. That is, the relationship between the occupants P1 and P2 carrying the terminals 2A and 2B may be estimated to be stronger the more messages have been exchanged between the terminals 2A and 2B in addition to the respective follow information being registered between the terminals 2A and 2B.

Second Modified Example

In the above-described embodiment, an example in which four people including the driver ride in the vehicle cabin has been described, but the number of occupants is not limited to four, and may be six or 10. Furthermore, when the Vehicle 100 is a Self-Driving vehicle, the driver may not be specified.

Third Modified Example

In the above-described embodiment, the first modified example, and the second modified example, the vehicle 100 serving as a moving body has been exemplified as an example of a vehicle cabin in which content is reproduced by the content reproduction apparatus 200, but a cabin of a moving body on which a plurality of occupants board may be handled in the same manner as the above-described vehicle cabin.

The above embodiment can be combined as desired with one or more of the above modifications. The modifications can also be combined with one another.

According to the present invention, it is possible to naturally promote conversation without imposing a psychological or physical burden on the occupant.

Above, while the present invention has been described with reference to the preferred embodiments thereof, it will be understood, by those skilled in the art, that various changes and modifications may be made thereto without departing from the scope of the appended claims.

What is claimed is:

1. A content reproduction apparatus configured to reproduce content in a vehicle, the apparatus comprising an ambient light provided in an interior of the vehicle; and a microprocessor configured to perform:

communicating with terminals carried by a plurality of occupants riding in the vehicle, via wireless communication;

acquiring content managed by the terminals, via the wireless communication;

reproducing the content;

causing the ambient light to emit light for urging an occupant carrying a terminal that manages the content being reproduced to explain the content;

acquiring personal information stored in each of the terminals, via the wireless communication; and generating relationship level information indicating a strength of a relationship between the plurality of occupants based on the personal information, wherein the microprocessor is configured to perform the acquiring of the content including enabling acquisition of the content with a higher degree of privacy as the relationship is stronger, based on the relationship level information.

2. The content reproduction apparatus according to claim 1, wherein the microprocessor is configured to perform:

the acquiring of the content including determining a search range of content based on the relationship level information and acquiring the content according to the search range; and the search range is determined such that the stronger the relationship indicated by the relationship level information, the higher the degree of privacy of the content included in a search target.

3. The content reproduction apparatus according to claim 1, wherein the microprocessor is configured to perform:

the acquiring of the personal information including acquiring information of a telephone directory registered by each of the occupants from the terminals as the personal information; and the generating including estimating that the relationship between the plurality of occupants is strong in a case where phone numbers are registered mutually between the terminals, and estimating that the relationship is stronger in a case where an attribute given to a phone number registered in one of the terminals indicates a relative.

4. The content reproduction apparatus according to claim 1, wherein the microprocessor is configured to perform:

the acquiring of the personal information including acquiring follow information of a social network service registered by each of the occupants from the terminals as the personal information; and the generating including estimating that the relationship between the plurality of occupants is strong when the follow information is registered between the terminals in the vehicle.

5. The content reproduction apparatus according to claim 1, wherein the microprocessor is configured to perform:

the acquiring of the personal information including acquiring home position information of each of the occupants from the terminals as the personal information; and the generating including estimating that the relationship between the plurality of occupants is strong when the home position information matches among the terminals.

6. The content reproduction apparatus according to claim 1, wherein the ambient light is provided for each seat of the plurality of occupants, and the microprocessor is configured to perform:

the causing including causing the ambient light corresponding to a seat of the occupant carrying the terminal that manages the content being reproduced to emit light.

7. The content reproduction apparatus according to claim 1, wherein the microprocessor is configured to perform:

detecting an amount of conversation among the plurality of occupants riding in the vehicle; and acquiring the content managed by the terminals via the wireless communication and reproducing the content, when the amount of conversation decreases to a predetermined value or less.

8. The content reproduction apparatus according to claim 1, wherein the microprocessor is configured to perform:

refraining from reproducing the content in a case where the content includes video and the video includes a person other than the plurality of occupants.

* * * * *